(12) United States Patent  (10) Patent No.: US 8,433,442 B2
Friedman et al.  (45) Date of Patent: Apr. 30, 2013

(54) METHODS FOR REPURPOSING TEMPORAL-SPATIAL INFORMATION COLLECTED BY SERVICE ROBOTS

(75) Inventors: Scott Justin-Marl Friedman, Pittsburgh, PA (US); Hans Peter Moravec, Pittsburgh, PA (US)

(73) Assignee: Seegrid Corporation, Pittsburgh, PA (US)

( * ) Notice: Subject to any disclaimer, the term of this patent is extended or adjusted under 35 U.S.C. 154(b) by 483 days.

(21) Appl. No.: 12/361,379

(22) Filed: Jan. 28, 2009

(65) Prior Publication Data

US 2009/0198381 A1  Aug. 6, 2009

Related U.S. Application Data

(60) Provisional application No. 61/024,028, filed on Jan. 28, 2008.

(51) Int. Cl.
*G06F 19/00* (2011.01)
*G05B 13/00* (2006.01)

(52) U.S. Cl.
USPC .............................. 700/245; 700/275; 700/259

(58) Field of Classification Search .................. 700/245, 700/259; 901/1, 47, 50
See application file for complete search history.

(56) References Cited

U.S. PATENT DOCUMENTS

| | | | |
|---|---|---|---|
| 4,674,048 A | 6/1987 | Okumura | |
| 5,032,775 A | 7/1991 | Mizuno et al. | |
| 5,086,535 A | 2/1992 | Grossmeyer et al. | |
| 5,369,347 A | 11/1994 | Yoo | |
| 5,440,216 A | 8/1995 | Kim | |
| 5,534,762 A | 7/1996 | Kim | |
| 5,682,313 A | 10/1997 | Edlund et al. | |
| 5,684,695 A | 11/1997 | Bauer | |
| 5,867,800 A * | 2/1999 | Leif ................................ | 701/23 |
| 6,076,025 A | 6/2000 | Ueno et al. | |
| 6,124,694 A | 9/2000 | Bancroft et al. | |

(Continued)

FOREIGN PATENT DOCUMENTS

| | | |
|---|---|---|
| JP | 11-104984 A | 4/1999 |
| JP | 2002-254374 A | 9/2002 |

(Continued)

OTHER PUBLICATIONS

International Search Report dated Aug. 31, 2009 issued in corresponding International Application No. PCT/US2009/032274.

(Continued)

*Primary Examiner* — Ian Jen
(74) *Attorney, Agent, or Firm* — Onello & Mello, LLP

(57) ABSTRACT

Robots and methods implemented therein implement an active repurposing of temporal-spatial information. A robot can be configured to analyze the information to improve the effectiveness and efficiency of the primary service function that generated the information originally. A robot can be configured to use the information to create a three dimensional (3D) model of the facility, which can be used for a number of functions such as creating virtual tours of the environment, or porting the environment into video games. A robot can be configured to use the information to recognize and classify objects in the facility so that the ensuing catalog can be used to locate selected objects later, or to provide a global catalog of all items, such as is needed for insurance documentation of facility effects.

24 Claims, 2 Drawing Sheets

U.S. PATENT DOCUMENTS

| | | | |
|---|---|---|---|
| 6,278,904 B1 | 8/2001 | Ishii | |
| 6,374,155 B1 | 4/2002 | Wallach et al. | |
| 6,389,329 B1 | 5/2002 | Colens | |
| 6,459,955 B1 | 10/2002 | Bartsch et al. | |
| 6,496,754 B2 | 12/2002 | Song et al. | |
| 6,496,755 B2 | 12/2002 | Wallach et al. | |
| 6,532,404 B2 | 3/2003 | Colens | |
| 6,539,284 B2 | 3/2003 | Nourbakhsh et al. | |
| 6,604,022 B2 | 8/2003 | Parker et al. | |
| 6,611,120 B2 | 8/2003 | Song et al. | |
| 6,667,592 B2 * | 12/2003 | Jacobs et al. | 318/568.12 |
| 6,728,608 B2 | 4/2004 | Ollis et al. | |
| 6,732,826 B2 * | 5/2004 | Song et al. | 180/169 |
| 6,760,647 B2 | 7/2004 | Nourbakhsh et al. | |
| 6,774,596 B1 | 8/2004 | Bisset | |
| 6,841,963 B2 * | 1/2005 | Song et al. | 318/568.12 |
| 6,868,307 B2 | 3/2005 | Song et al. | |
| 6,870,792 B2 | 3/2005 | Chiappetta | |
| 6,879,878 B2 * | 4/2005 | Glenn et al. | 700/245 |
| 6,883,201 B2 | 4/2005 | Jones et al. | |
| 6,925,679 B2 | 8/2005 | Wallach et al. | |
| 6,957,712 B2 | 10/2005 | Song et al. | |
| 6,968,592 B2 | 11/2005 | Takeuchi et al. | |
| 6,984,952 B2 | 1/2006 | Peless et al. | |
| 7,024,278 B2 | 4/2006 | Chiappetta et al. | |
| 7,155,308 B2 | 12/2006 | Jones | |
| 7,162,056 B2 | 1/2007 | Burl et al. | |
| 7,167,775 B2 | 1/2007 | Abramson et al. | |
| 7,188,000 B2 | 3/2007 | Chiappetta et al. | |
| 7,206,677 B2 | 4/2007 | Hulden | |
| 7,251,548 B2 | 7/2007 | Herz et al. | |
| 7,446,766 B2 | 11/2008 | Moravec | |
| 7,447,593 B2 | 11/2008 | Estkowski et al. | |
| 7,526,362 B2 | 4/2009 | Kim et al. | |
| 7,720,572 B2 | 5/2010 | Ziegler et al. | |
| 7,805,220 B2 | 9/2010 | Taylor et al. | |
| 7,835,821 B2 | 11/2010 | Roh et al. | |
| 2002/0138936 A1 | 10/2002 | Takeuchi et al. | |
| 2003/0025472 A1 * | 2/2003 | Jones et al. | 318/568.12 |
| 2004/0030571 A1 | 2/2004 | Solomon | |
| 2004/0073337 A1 * | 4/2004 | McKee et al. | 700/245 |
| 2004/0076324 A1 | 4/2004 | Burl et al. | |
| 2004/0167716 A1 | 8/2004 | Goncalves et al. | |
| 2004/0168148 A1 | 8/2004 | Goncalves et al. | |
| 2004/0204792 A1 * | 10/2004 | Taylor et al. | 700/245 |
| 2004/0207355 A1 * | 10/2004 | Jones et al. | 318/568.12 |
| 2005/0000543 A1 * | 1/2005 | Taylor et al. | 134/18 |
| 2005/0067994 A1 * | 3/2005 | Jones et al. | 318/568.12 |
| 2005/0080514 A1 | 4/2005 | Omote et al. | |
| 2005/0134209 A1 * | 6/2005 | Kim | 318/568.12 |
| 2005/0216126 A1 * | 9/2005 | Koselka et al. | 700/259 |
| 2005/0273226 A1 * | 12/2005 | Tani | 701/23 |
| 2005/0273967 A1 | 12/2005 | Taylor et al. | |
| 2005/0287038 A1 | 12/2005 | Dubrovsky et al. | |
| 2005/0288079 A1 * | 12/2005 | Tani | 463/1 |
| 2006/0020369 A1 * | 1/2006 | Taylor et al. | 700/245 |
| 2006/0038521 A1 * | 2/2006 | Jones et al. | 318/567 |
| 2006/0060216 A1 | 3/2006 | Woo | |
| 2006/0061476 A1 | 3/2006 | Patil et al. | |
| 2006/0095158 A1 | 5/2006 | Lee et al. | |
| 2006/0178777 A1 * | 8/2006 | Park et al. | 700/245 |
| 2006/0293788 A1 | 12/2006 | Pogodin | |
| 2007/0042716 A1 | 2/2007 | Goodall et al. | |
| 2007/0135962 A1 | 6/2007 | Kawabe et al. | |
| 2007/0192910 A1 | 8/2007 | Vu et al. | |
| 2007/0199108 A1 | 8/2007 | Angle et al. | |
| 2007/0244610 A1 | 10/2007 | Ozick et al. | |
| 2008/0004904 A1 | 1/2008 | Tran | |
| 2008/0086236 A1 | 4/2008 | Saito et al. | |
| 2008/0109114 A1 | 5/2008 | Orita et al. | |
| 2008/0184518 A1 | 8/2008 | Taylor et al. | |

FOREIGN PATENT DOCUMENTS

| | | |
|---|---|---|
| JP | 2003-515210 A | 4/2003 |
| JP | 2004-97439 | 4/2004 |
| JP | 2004-097439 A | 4/2004 |
| JP | 2005-111603 A | 4/2005 |
| JP | 2006-007368 A | 1/2006 |
| JP | 2006-087918 A | 4/2006 |
| JP | 2006-102861 A | 4/2006 |
| KR | 10-2002-0076153 A | 10/2002 |
| KR | 10-2002-0081035 A | 10/2002 |
| KR | 10-2002-0088880 A | 11/2002 |
| KR | 10-0645818 B1 | 11/2006 |
| WO | 01/37060 | 5/2001 |
| WO | 0137060 A1 | 5/2001 |
| WO | 2007/051972 | 5/2007 |

OTHER PUBLICATIONS

International Search Report dated Sep. 14, 2009 issued in corresponding International Application No. PCT/US2009/032243.

International Search Report dated Sep. 14, 2009 issued in corresponding International Application No. PCT/US2009/032245.

International Search Report dated Sep. 30, 2009 issued in corresponding International Application No. PCT/US2009/034081.

Bennewitz, et al., "Adapting Navigation Strategies Using Motions Patterns of People", 2003, Proceedings of the 2003 IEEE International Conference on Robotics & Automation, pp. 2000-2005.

Alami, et al., "Diligent: Towards a Human-Friendly Navigation System", 2000, Proceedings of the 2000 IEEE/RSJ International Conference on Intelligent Robots and Systems, pp. 21-26.

Lee, et al., "An Agent for Intelligent Spaces: Functions and Roles of Mobile Robots in Sensored, Networked and Thinking Spaces", 1997, IEEE Conference on Intelligent Transportation System (ITSC '97), pp. 983-988.

Extended European Search Report dated Feb. 22, 2011 issued in corresponding European Application No. EP09706350.

Extended European Search Report dated Mar. 7, 2011 issued in corresponding European Application No. EP09705670.

Extended European Search Report dated Mar. 8, 2011 issued in corresponding European Application No. EP09706723.

\* cited by examiner

US 8,433,442 B2

METHODS FOR REPURPOSING TEMPORAL-SPATIAL INFORMATION COLLECTED BY SERVICE ROBOTS

CROSS-REFERENCE TO RELATED APPLICATION

This application claims the benefit of priority under 35 U.S.C. § 119(e) from provisional application Ser. No. 61/024,028, entitled "METHODS FOR REPURPOSING TEMPORAL-SPATIAL INFORMATION COLLECTED BY SERVICE ROBOTS," filed on Jan. 28, 2008 which is incorporated herein by reference in its entirety.

FIELD OF INTEREST

The present inventive concepts relate to methods for repurposing temporal-spatial information collected by service robots.

BACKGROUND

Service robots have traditionally been tasked with doing the dull and dirty jobs in human facilities, such as homes, commercial and industrial buildings. However, that very action of performing the service creates a large fund of temporal-spatial information and knowledge about the facility in which the work is performed.

Previous service robots have ignored this large fund of information and knowledge as an asset, resulting in its waste.

SUMMARY OF INVENTION

According to one aspect of the invention, provided is a method of servicing a facility with at least one service robot that obtains temporal-spatial information. The method includes: navigating a robot through an environment using automatic self-control by the robot; sensing the temporal-spatial information while performing a primary service function; and storing the temporal-spatial information.

The method can further include communicating the temporal-spatial information via a wireless network to a control system.

The method can further include at least one other service robot accessing the temporal-spatial information from the control system via the wireless network.

The method can further include at least one other autonomous control system accessing the temporal-spatial information from the control system.

The method can further include the service robot directly communicating the temporal-spatial information via a wireless network to at least one other service robot.

The method can further include the service robot performing a secondary service using the temporal-spatial information.

The method can further include the service robot analyzing the temporal-spatial information to improve the effectiveness and efficiency of the primary service that originally generated the temporal-spatial information.

The method can further include creating a three dimensional (3D) model of the environment using the temporal-spatial information.

The method can further include creating virtual tours from the 3D model.

The method can further include porting the 3D model of the environment to another system.

The method can further include recognizing and classifying objects in the environment using the temporal-spatial information.

The method can further include generating a catalog of objects and using the catalog to subsequently locate selected objects in the environment.

The at least one service robot can be a robotic vacuum cleaner.

In accordance with another aspect of the invention, provided is a service robot system. The service robot includes: a platform supporting a servicing subsystem; a navigation controller coupled to a drive mechanism and configured to navigate the platform through an environment; one or more sensors configured to sense collect temporal-spatial information while performing a primary service; and a storage media on which the temporal-spatial information is stored.

The system can further include a communication module configured to communicate the temporal-spatial information via a wireless network to a control system.

At least one other service robot can be configured to access the temporal-spatial information from the control system via the wireless network.

The system can further include a communication module configured to directly communicate the temporal-spatial information via a wireless network to at least one other service robot.

The service robot can be configured to perform a secondary service using the temporal-spatial information.

The service robot can be further configured to analyze the temporal-spatial information to improve the effectiveness and efficiency of the primary service that originally generated the temporal-spatial information.

The service robot can be further configured to create a three dimensional (3D) model of the environment using the temporal-spatial information.

The service robot can be further configured to recognize and classify objects in the environment using the temporal-spatial information.

The service robot can be further configured to generate a catalog of objects and to use the catalog to subsequently locate selected objects in the environment.

The service robot can be a robotic vacuum cleaner.

The system can further include at least one other autonomous control system configured to access the temporal-spatial information from the control system.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENT

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Figure 1:
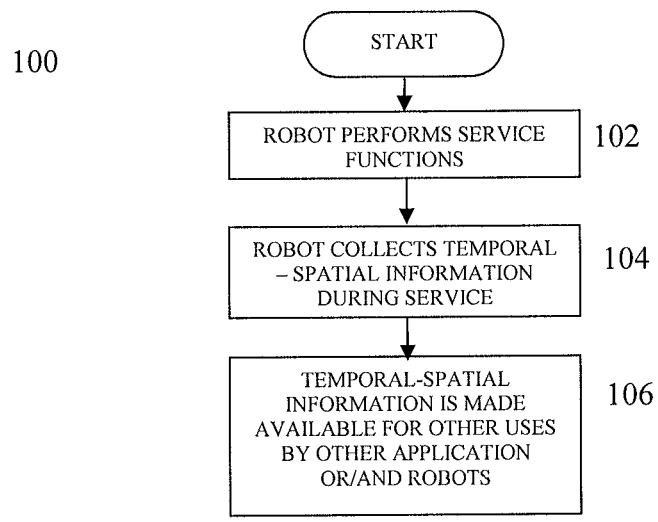
FIG. 1 is a flowchart of an embodiment of a method for illustrating the control operation procedures of a robot using temporal-spatial information.

FIG. 1 is a flowchart 100 of an embodiment of a method for controlling a service robot using temporal-spatial information. In this embodiment the service robot is a cleaning robot, such as a robotic vacuum.

In step 102, the robot performs the service functions, such as vacuuming. In step 104 the robot collects temporal-spatial information while performing the service, e.g., as in step 102. In step 106 the temporal-spatial information is made available for other uses by other applications and/or robots—and/or by the robot collecting the information. For example, in some implementations robots can work in teams and communicate such information back and forth via wireless networks. One robot could scout locations requiring service and note whether they are occupied and communicate the need and availability to another one or more robots—as an example.

The robots can include sensors to collect such temporal-spatial information, such as those generally known in the art. For example, sensors could include acoustic, motion detection, camera or other sensors.

As will be appreciated by those skilled in the art, a service robot (e.g., vacuum) includes a memory for storing instructions and data, and a processor for executing the instructions. Thus, the methods discussed above can be programmed into the service robot for execution to accomplish the functions disclosed herein.

Also, while the service robot was indicated as a robotic cleaner in this embodiment, those skilled in the art will appreciate that methods in accordance with the present invention could be applied to any number of service robots, and could implement any number and types of sensors.

In another embodiment the service robot would communicate the temporal-spatial data collected to a server or other computer, which would include the processor for manipulating the data and a storage system for storing the data. This server could be used to communicate the re-purposed information back to the original robot, or to other robots or servers which can make use of it.

As an example, the following description will describe a potential application for this method and illustrate its operation. A service robot is used to clean the floors in an industrial facility. It is programmed to follow a path which carries it throughout the facility. A temperature sensor is mounted to the robot, and as it is doing its primary function, it is also recording the temperature of the environment at intervals along the programmed path. The temperature-location data is transmitted to the facility heating system, which maps the position data from the robot to its control zones. It thus can use the recorded temperatures to adjust the heating output of the different zones.

Figure 2:
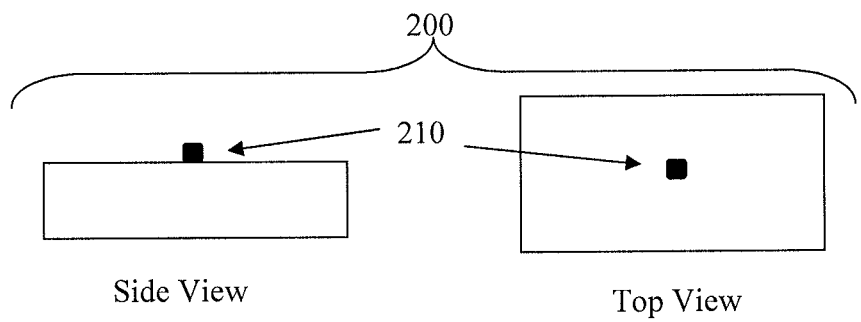
FIG. 2 shows an embodiment of a service robot including an upward facing sensor.

FIG. 2 shows an embodiment of a service robot 200 including an upward facing sensor 210. The sensor 210 can be used to determine characteristics of the environment in the area. The determination may be based on other perceptual techniques such as acoustics, motion detection, etc. In still other embodiments, the determination method may be based on a combination thereof.

Figure 3:
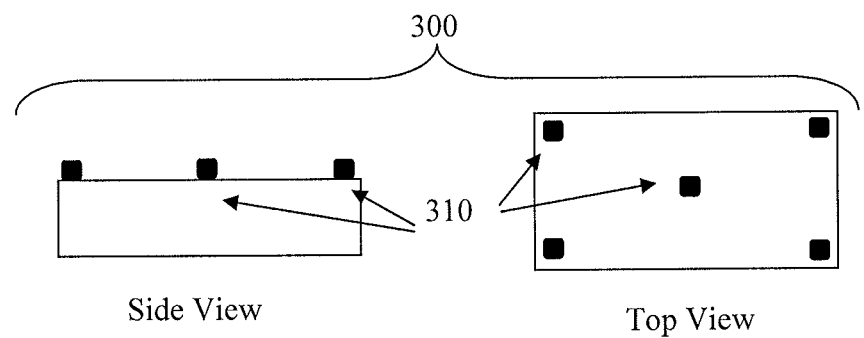
FIG. 3 shows an embodiment of a service robot including multiple sensors.

FIG. 3 shows an embodiment of a service robot 300 with multiple sensors 310 that allow the robot 300 to determine the characteristics of the environment in the area.

Figure 4:
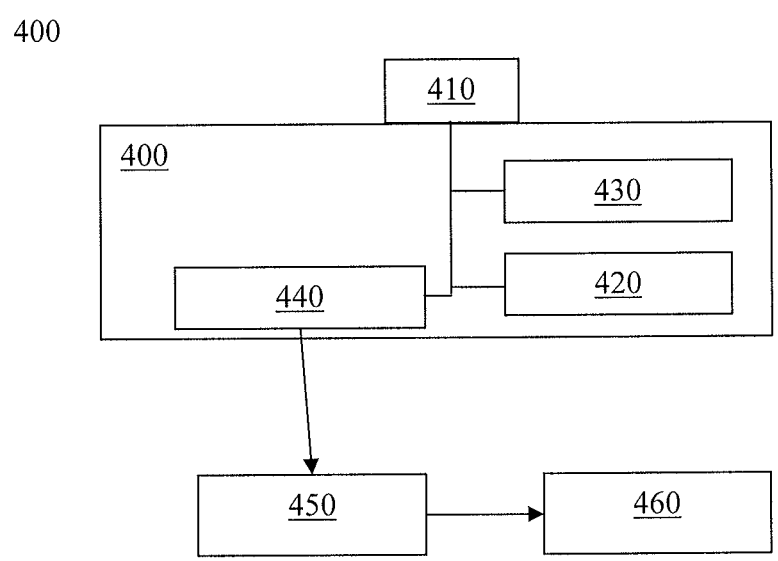
FIG. 4 shows an embodiment of a system for repurposing temporal-spatial information collected by an automatically navigating robot.

FIG. 4 shows an embodiment of a system for repurposing temporal-spatial information from a robot. Component 400 is the service robot, component 410 is the sensor mounted to the robot, component 420 is the localization system of the robot which provides the location, or spatial information, component 430 is the robot executive controller which manages the autonomous operation of the robot, component 440 is a communication means to transmit the spatial-temporal information to the data storage system 450. The data storage system 450 stores the temporal-spatial information, and any metadata required for its interpretation. Component 460 is a transformation system that adapts the information to a form usable by a requesting application.

While reference has been made to using wireless networks, in various embodiments any of a variety of data communication schemes can be used, such as wired, (batch) wireless, networked, Point-to-point, and so on.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein.

What is claimed is:

1. A method of servicing a facility, the method comprising:
   an autonomous first robot self-navigating through an environment while performing a first service function, wherein the first service function is a cleaning or an environmental control function;
   the first robot sensing and storing temporal-spatial information while performing the first service function;
   the first robot communicating the temporal-spatial information to an autonomous second robot or to control system; and
   repurposing the temporal-spatial information by the second robot or the control system using at least some of the temporal-spatial information for a second service function, which is different from the first service function.

2. The method of claim 1, further comprising communicating the temporal-spatial information via a wireless network to the control system.

3. The method of claim 2, further comprising the second robot accessing the temporal-spatial information from the control system via the wireless network.

4. The method of claim 2, further comprising at least one other autonomous control system accessing the temporal-spatial information from the control system.

5. The method of claim 1, further comprising the first robot directly communicating the temporal-spatial information via a wireless network to the second robot.

6. The method of claim 1, wherein the secondary service comprises at least one of cleaning or climate control.

7. The method of claim 1, further comprising the service robot analyzing the temporal-spatial information to improve the effectiveness and efficiency of the first service function.

8. The method of claim 1, further comprising creating a three dimensional (3D) model of the environment using the temporal-spatial information.

9. The method of claim 8, further comprising creating virtual tours from the 3D model.

10. The method of claim 8, further comprising porting the 3D model of the environment to a second system.

11. The method of claim 1, further comprising recognizing and classifying objects in the environment using the temporal-spatial information.

12. The method of claim 10, further comprising generating a catalog of objects and using the catalog to subsequently locate selected objects in the environment.

13. The method of claim 1, wherein the the first robot is a robotic vacuum cleaner.

14. A service robot system, comprising:
    a first robot comprising:
       a platform supporting a first servicing subsystem;
       a navigation controller coupled to a drive mechanism and configured to autonomously self-navigate the platform through an environment;
       one or more sensors configured to collect temporal-spatial information while performing a first service function, wherein the first service function is a cleaning function;
       a storage media on which the temporal-spatial information is stored;
       a communication module configured to communicate the temporal-spatial information to an autonomous second robot or to control system; and
    wherein the second robot or control system is configured to repurpose at least some of the stored temporal-spatial information for a second service function, which his different from the first service function.

15. The system of claim 14, wherein the communication module is further configured to communicate the temporal-spatial information via a wireless network to the control system.

16. The system of claim 15, wherein the second robot is configured to access the temporal-spatial information from the control system via the wireless network.

17. The system of claim 14, wherein the communication module is configured to directly communicate the temporal-spatial information via a wireless network to the second robot.

18. The system of claim 14, wherein the secondary service comprises at least one of cleaning or climate control.

19. The system of claim 14, wherein the first robot is further configured to analyze the temporal-spatial information to improve the effectiveness and efficiency of the first service function.

20. The system of claim 14, wherein the first robot is further configured to create a three dimensional (3D) model of the environment using the temporal-spatial information.

21. The system of claim 14, wherein the first robot is further configured to recognize and classify objects in the environment using the temporal-spatial information.

22. The system of claim 21, wherein the first robot is further configured to generate a catalog of objects and to use the catalog to subsequently locate selected objects in the environment.

23. The system of claim 14, wherein the first robot is a robotic vacuum cleaner.

24. The system of claim 14, further comprising at least one other autonomous control system configured to access the temporal-spatial information from the control system.

* * * * *

UNITED STATES PATENT AND TRADEMARK OFFICE
CERTIFICATE OF CORRECTION

| | |
|---|---|
| PATENT NO. | : 8,433,442 B2 |
| APPLICATION NO. | : 12/361379 |
| DATED | : April 30, 2013 |
| INVENTOR(S) | : Scott Justin-Marl Friedman et al. |

It is certified that error appears in the above-identified patent and that said Letters Patent is hereby corrected as shown below:

In the Claims

Column 5, line 50 delete "the"

Column 6, line 17 delete "his" and insert --is--

Signed and Sealed this
Tenth Day of December, 2013

Margaret A. Focarino
*Commissioner for Patents of the United States Patent and Trademark Office*